(12) United States Patent
Dannenberg (10) Patent No.: US 9,139,994 B2
(45) Date of Patent: Sep. 22, 2015

(54) TOILET SYSTEM WITH DECENTRALIZED FLUSHING FLUID SOURCE

(75) Inventor: Andreas Dannenberg, Neu Wulmstorf (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 479 days.

(21) Appl. No.: 13/327,053

(22) Filed: Dec. 15, 2011

(65) Prior Publication Data

US 2012/0151666 A1    Jun. 21, 2012

Related U.S. Application Data

(60) Provisional application No. 61/423,413, filed on Dec. 15, 2010.

(30) Foreign Application Priority Data

Dec. 15, 2010   (DE) .......................... 10 2010 054 611

(51) Int. Cl.
| | |
|---|---|
| *E03D 1/00* | (2006.01) |
| *E03D 5/00* | (2006.01) |
| *B64D 11/02* | (2006.01) |
| *E03D 3/10* | (2006.01) |

(52) U.S. Cl.
CPC ................ *E03D 5/003* (2013.01); *B64D 11/02* (2013.01); *E03D 3/10* (2013.01)

(58) Field of Classification Search
CPC ........... E03D 5/003; E03D 5/006; E03D 5/01; E03D 5/10; E03C 1/01; B64D 11/02; B60R 15/02; B60R 15/04; B61D 35/002; B61D 35/005; B61D 35/007

USPC ............ 4/316, 321, 323, 431, 432, 434, 664, 4/665

See application file for complete search history.

(56) References Cited

U.S. PATENT DOCUMENTS

| | | | | |
|---|---|---|---|---|
| 3,054,117 | A * | 9/1962 | Cella .................................. | 4/321 |
| 3,392,407 | A * | 7/1968 | Booth ................................ | 4/664 |
| 3,418,664 | A * | 12/1968 | Carmichael et al. ............... | 4/317 |
| 3,428,964 | A * | 2/1969 | Lucas ................................ | 4/665 |
| 3,594,825 | A * | 7/1971 | Reid .................................. | 4/663 |
| 3,611,446 | A | 10/1971 | Howard | |
| 3,995,328 | A | 12/1976 | Carolan et al. | |
| 4,275,470 | A * | 6/1981 | Badger et al. ...................... | 4/316 |
| 4,358,864 | A * | 11/1982 | Medrano ............................ | 4/665 |
| 5,201,562 | A * | 4/1993 | Dorsey ......................... | 296/39.2 |
| 5,214,807 | A * | 6/1993 | Terve ................................. | 4/321 |

(Continued)

FOREIGN PATENT DOCUMENTS

DE     102007018549 A1    10/2008

OTHER PUBLICATIONS

German Patent Office, German Office Action dated Jan. 28, 2013 for German Patent Application No. 102010054611.9.

*Primary Examiner* — Lauren Crane
*Assistant Examiner* — Erin Deery
(74) *Attorney, Agent, or Firm* — Ingrassia Fisher & Lorenz, P.C.

(57) ABSTRACT

Toilets of a toilet system on board a vehicle are supplied with flushing agent from decentralized supply devices. Disposal of the wastewater takes place by way of a central disposal device. Thus, a toilet system without central supply of the toilets with flushing agent is stated, as a result of which weight may be saved.

9 Claims, 5 Drawing Sheets

(56) References Cited

U.S. PATENT DOCUMENTS

| | | | |
|---|---|---|---|
| 5,749,102 A * | 5/1998 | Duell | 4/431 |
| 5,813,047 A * | 9/1998 | Teichroeb | 4/665 |
| 7,947,164 B2 | 5/2011 | Hoffjann et al. | |
| 2007/0089235 A1 * | 4/2007 | Devinat et al. | 4/620 |
| 2010/0116935 A1 | 5/2010 | Rieger et al. | |

* cited by examiner

TOILET SYSTEM WITH DECENTRALIZED FLUSHING FLUID SOURCE

CROSS-REFERENCE TO RELATED APPLICATIONS

This application claims priority to German Patent Application No. 10 2010 054 611.9, filed Dec. 15, 2010, and also claims priority to U.S. Provisional Patent Application No. 61/423,413, filed Dec. 15, 2010, the disclosure of which applications are hereby incorporated herein by reference.

TECHNICAL FIELD

The technical field relates to toilet systems. In particular, the technical field relates to toilet systems for a vehicle, to a vehicle comprising a toilet system, and to a method for flushing a toilet system.

BACKGROUND

Toilet systems for vehicles that comprise distributed toilets are, in particular, required in the case of substantial numbers of passengers, and used to improve user convenience. DE 10 2007 018 549 A1 and US 2010/0116935 A1 describe known toilets for connection to a toilet system on board aircraft.

In this arrangement, for the transport of wastewater and for collecting the wastewater, the toilets connect to a vacuum pipe bundle. In this arrangement, the vacuum pipe bundle for the transport and for the disposal of wastewater from the toilets is designed in such a manner that all the toilets of the toilet system located in the vehicle are interconnected. By means of a comparable pipe bundle, the toilets of the toilet system are connected to be supplied with flushing agent, such as a flushing fluid, e.g., a liquid, a gas or a liquid/gas mixture, e.g., water.

Accordingly, it is desirable to provide at least a toilet system for a vehicle, a transport comprising a toilet system, and a method for flushing a toilet system for a vehicle. In addition, other desirable features and characteristics will become apparent from the subsequent summary and detailed description, and the appended claims, taken in conjunction with the accompanying drawings and this background.

SUMMARY

Stated are a toilet system for a vehicle, a transport comprising a toilet system, and a method for flushing a toilet system for a vehicle.

According to a first embodiment, a toilet system comprises at least one first toilet unit and one second toilet unit that are designed for installation in the vehicle. Furthermore, at least one first decentralized supply device comprising a first flushing agent tank, and a second decentralized supply device comprising a second flushing agent tank, as well as a central disposal device for receiving waste water from the first toilet unit and from the second toilet unit are provided.

In this arrangement, the first flushing agent tank is used for supplying the first toilet unit with a first flushing agent, and the second flushing agent tank is used for supplying the second toilet unit with a second flushing agent. In this arrangement, the flushing agent tank can be made from a flexible material or a rigid material or from a combination of these two materials. In this arrangement a liquid, for example water, can be used as a flushing agent. This water can either be fresh water or gray water; in particular, this water can comprise an antibacterial additive and/or fragrant substances. The term "gray water" refers to water which was, for example, used in a wash unit (i.e. a wash basin 114) and which comprises, for example, soap residues. This arrangement may make it possible to do without a bundle of pipes for centrally supplying the toilet units of the toilet system with a flushing agent.

According to one embodiment, the first decentralized supply device and the second decentralized supply device of the toilet system comprise at least one fresh-water tank. The fresh-water tank may make it possible to supply a wash unit (not described in detail) associated with the toilet unit with fresh water. The fresh-water tank can be designed in such a manner that it comprises a flexible membrane that separates two regions from each other. In this arrangement, a first region is provided for fresh water and a second region is provided for gray water.

According to a further embodiment, the first decentralized supply device and the second decentralized supply device further comprise a pressure accumulator and a housing. In this arrangement, the housing is designed in such a manner that it encloses the pressure accumulator and the corresponding flushing agent tank. The pressure accumulator is used to provide and deliver a pressure. In this arrangement, the flushing agent is forced by the pressure to leave the corresponding flushing agent tank and to enter the toilet unit.

According to a further embodiment, the pressure accumulator is a pressure cartridge that can be inserted in a modular manner into the decentralized supply device. This may make possible the optional use of the pressure accumulator for generating pressure apart from other options, described below, for generating pressure and applying it on the flushing agent in the corresponding flushing agent tank. According to a further embodiment, the pressure in the pressure accumulator is generated by a chemical reaction.

According to a further embodiment, the decentralized supply device of the toilet system furthermore comprises a movable intermediate floor. In this arrangement the movable intermediate floor is designed in such a manner that, as a result of a weight force of the fresh-water tank, pressure is exerted on the first or on the second flushing agent tank and on the flushing agent contained therein. Furthermore, a dedicated intermediate floor can be provided for each individual flushing agent tank.

The movable intermediate floor can be located outside or inside the flushing agent tank. If the movable intermediate floor is located inside the flushing agent tank, transmission of the weight force of the fresh-water tank to the movable intermediate floor takes place, for example, by way of a piston so that the movable intermediate floor exerts pressure on the flushing agent in the flushing agent tank. Apart from the option, as explained further above, of generating pressure by means of a pressure accumulator, the aforesaid represents a further option of exerting pressure on the flushing agent tank and the flushing agent contained therein.

According to a further embodiment, the toilet system comprises a pressure reducer arranged between the flushing agent tank and the toilet unit. The pressure reducer is designed to generate a constant output pressure from a fluctuating input pressure. In this arrangement the various options, explained further above, of generating pressure and applying it to the flushing agent tank and the flushing agent contained therein are to be considered the input pressure. The pressure of the flushing agent on the toilet unit is to be considered the output pressure.

According to a further embodiment, a pump is provided that forces the flushing agent from the flushing agent tank into the toilet unit. In this arrangement, the pump can be provided as an alternative to or in conjunction with the above-mentioned options of exerting pressure on the flushing agent tank and the flushing agent contained therein. Likewise, the pump can also be designed to commence operation when the above-mentioned options of generating pressure that acts on the flushing agent tank and on the flushing agent contained therein fail. Thus, redundancy for providing the pressure for the flushing action is generated.

According to a further embodiment, a flushing agent line is used for connecting the flushing agent tank to the toilet unit. In this arrangement, the pump described further above and the pressure reducer described further above can be arranged in the flushing agent line.

According to a further embodiment, at least one air inlet and at least one air outlet are arranged on the flushing agent tank. In this arrangement the at least one air inlet and the at least one air outlet can be arranged in a shared component. In this arrangement, the air inlet is designed to let air into the flushing agent tank when said flushing agent tank is emptied, in order to in this manner prevent a negative pressure, e.g., a vacuum, from arising in the flushing agent tank. In this arrangement the air outlet is designed to let air out of the flushing agent tank and in this way to prevent an overpressure from arising in the flushing agent tank when said flushing agent tank is filled with flushing agent, in order to in this manner make it possible to completely fill the flushing agent tank with flushing agent.

According to a further embodiment, the toilet system furthermore comprises a first impeller wheel in the flushing agent line, a second line, and a second impeller wheel in the second line. In the arrangement, the second impeller wheel is arranged in such a manner that it is driven by means of differential pressure in the second line. Furthermore, the first impeller wheel is arranged in the flushing agent line in such a manner that it is driven by the second impeller wheel by way of a connection, and the flushing agent is forced by the first impeller wheel in the flushing agent line to move into the toilet unit. In this arrangement, the first impeller wheel can be coupled to the second impeller wheel by means of a shaft or a gear arrangement.

According to a further embodiment, the flushing agent in the flushing agent tank comprises gray water. The gray water can be fresh water that has been used in a wash unit associated with the toilet unit. This arrangement is used to re-use water, for example on board aircraft. This approach supports economical use of the important resource of water in autarkical systems, for example on board aircraft.

According to a further embodiment, the stated use is provided for a toilet system described above and below on board a means of transport.

According to a further embodiment, a transport is designed as an aircraft.

According to a further embodiment a method for flushing a toilet system described above and below for a vehicle is stated, in which method a toilet unit is supplied with flushing agent from a decentralized supply device, and the waste water is disposed of from the toilet unit by way of a central disposal device.

According to the embodiments, of a toilet system may reduce expenditure associated with installation, testing, and maintenance. By means of decentralized supply units, variable adaptation to the framework conditions of the installation framework and usage framework becomes possible. Furthermore, a different addition of supplements to the flushing agent may become possible.

BRIEF DESCRIPTION OF THE DRAWINGS

The present invention will hereinafter be described in conjunction with the following drawing figures, wherein like numerals denote like elements and the illustrations in the figures are diagrammatic and not to scale, and.

DETAILED DESCRIPTION

The following detailed description is merely exemplary in nature and is not intended to limit application and uses. Furthermore, there is no intention to be bound by any theory presented in the preceding background or summary or the following detailed description of the invention.

Figure 1:
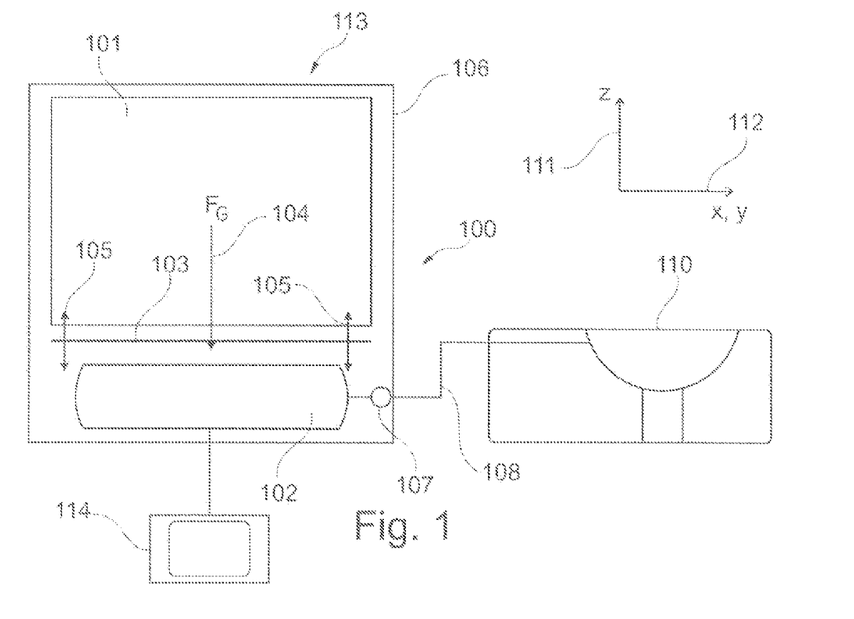
FIG. 1 shows a toilet for a vehicle with an option of generating pressure that acts on the flushing agent in the flushing agent tank according to an exemplary embodiment.

FIG. 1 shows a toilet 100 for a toilet system 700 for a vehicle according to an exemplary embodiment of the invention. The disposal device 701, 702, which disposes of the wastewater arising in the toilet 100, is not shown (see FIG. 7). The toilet 100 comprises a decentralized supply unit 113 as well as a toilet unit 110. In this arrangement, an enclosure 106 of the decentralized supply unit 113 comprises a fresh-water tank 101, a flushing agent tank 102, as well as a movable intermediate floor 103.

The movable intermediate floor 103 is designed in such a manner that due to a weight force 104 of the fresh-water tank 101 said intermediate floor 103 could move vertically along the directional arrows 105. Because of this movement, pressure is exerted on the flushing agent tank 102 and on the flushing agent contained therein. In this arrangement, the movable intermediate floor 103 is designed in such a manner that its movement takes place along the directional arrows 105 along an axis z 111. The axis z 111 is arranged in such a manner that it is arranged perpendicularly on an axis x 112 or on an axis y 112. In this arrangement, in the case of the use of the toilet system in an aircraft, the axis x 112 corresponds to the direction of flight and thus to a longitudinal axis of the vehicle, while the axis y 112 corresponds to a transverse direction of the vehicle and thus to a transverse axis of the vehicle. The axis z 111 thus extends parallel to a vertical axis of the vehicle. This means that the toilet 100 can be arranged either longitudinally, in other words parallel to a longitudinal axis of the vehicle, or transversely, in other words parallel to a transverse axis of the vehicle. In both cases, it is ensured that the movable intermediate floor 103 moves parallel to an axis z 111 and parallel to a vertical axis of the vehicle.

Furthermore, FIG. 1 shows that the flushing agent tank 102 is connected to the toilet unit 110 by way of a flushing agent line 108. In the flushing agent line 108, a pressure reducer 107 is arranged. The pressure reducer 107 ensures that despite possibly fluctuating pressure the flushing agent is forced into the toilet unit 110 through the movable intermediate floor 103 onto the flushing agent tank 102 at a constant pressure by way of the flushing agent line 108.

Figure 2:
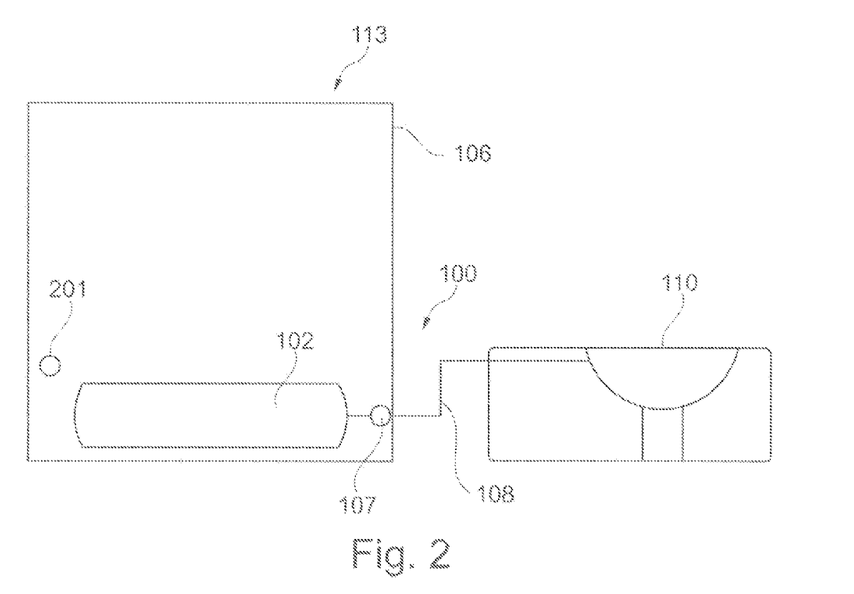
FIG. 2 shows a toilet for a vehicle with a further option of generating pressure that acts on the flushing agent in the flushing agent tank according to an exemplary embodiment.

FIG. 2 shows a further exemplary embodiment of a toilet 100 for a toilet system 700 for a vehicle. In this arrangement, a pressure accumulator 201 is provided for exerting pressure on the flushing agent contained in the flushing agent tank 102. The pressure accumulator 201 is designed to generate pressure within the enclosure 106 of the decentralized supply device 113, which pressure exceeds the pressure outside the enclosure 106. Because of this, the flushing agent is forced from the flushing agent tank 102 by way of the flushing agent line 108 into the toilet unit 110.

In order to ensure constant pressure of the flushing agent supplied to the toilet unit 110, in the flushing agent line 108 a pressure reducer 107 is arranged. Generating overpressure within the enclosure 106 by means of the pressure accumulator 201 requires the enclosure 106 to be designed to be essentially pressure-proof. Furthermore, the enclosure 106 can comprise a pressure-proof region (not shown) that encloses the pressure accumulator 201 and the flushing agent tank 102. In this arrangement the term "pressure-proof" means that an overpressure present within the enclosure 106 or within a pressure-proof region enclosed by the enclosure 106 is maintained in such a manner that the flushing agent can be forced from the flushing agent tank 102 by way of the flushing agent line 108 and the pressure reducer 107 into the toilet unit 110.

Figure 3:
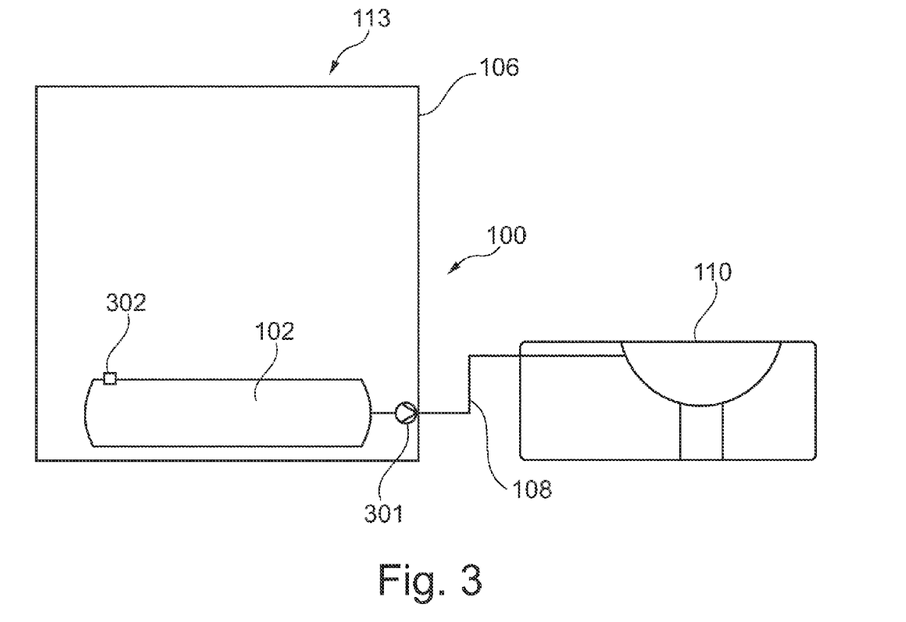
FIG. 3 shows a toilet for a vehicle with the option of conveying the flushing agent by means of a pump to the toilet unit according to an exemplary embodiment.

FIG. 3 shows a toilet 100 for a toilet system 700 for a vehicle according to an exemplary embodiment. In this arrangement a pump 301, arranged in the flushing agent line 108, is used to force the flushing agent to move from the flushing agent tank 102 into the toilet unit 110. In this arrangement, the flushing agent tank 102 comprises an air inlet 302 and an air outlet 302.

The air inlet 302 is designed to let air from the decentralized supply device 113 and within the enclosure 106 into the flushing agent tank 102. This prevents negative pressure relative to the enclosure 106 from arising in the flushing agent tank 102 when flushing agent is removed from the flushing agent tank 102. The air outlet 302 is designed to let air out of the flushing agent tank 102 when the flushing agent tank is filled with flushing agent. This prevents overpressure relative to the enclosure 106 from arising in the flushing agent tank 102 and makes it possible to completely fill the flushing agent tank with flushing agent.

The air inlet 302 and the air outlet 302 can be designed as individual elements or as elements within an individual component. This correspondingly applies to the exemplary embodiments described below.

Figure 4:
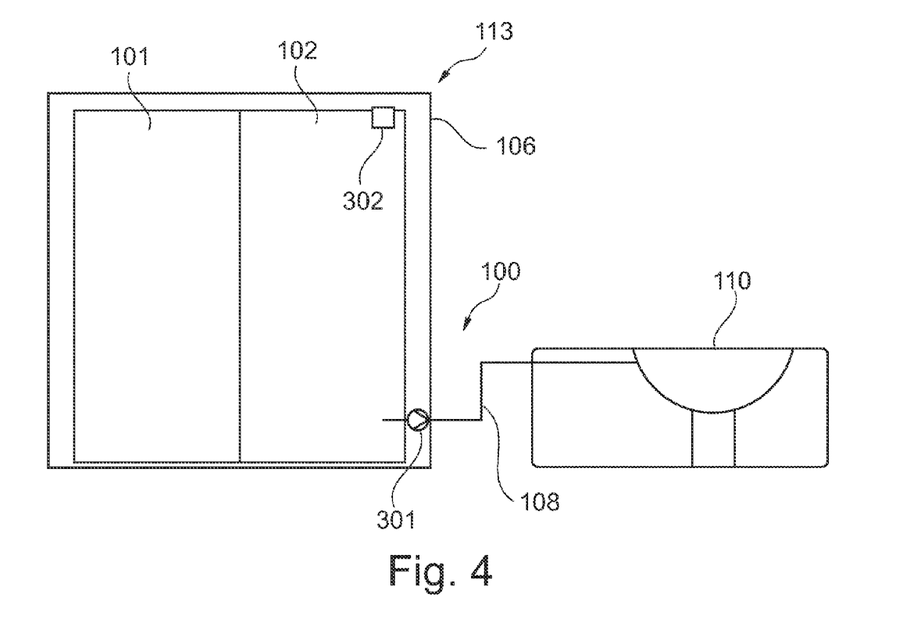
FIG. 4 shows a toilet for a vehicle according to an exemplary embodiment, where the supply device comprises a fresh-water tank and a flushing agent tank.

FIG. 4 shows a toilet 100 for a toilet system 700 for a vehicle according to a further exemplary embodiment. The enclosure 106 of the decentralized supply device 113 comprises a fresh-water tank 101 and a flushing agent tank 102. An air inlet 302, arranged on the flushing agent tank 102, ensures assimilation of the pressure within the flushing agent tank 102 to the pressure present within the enclosure 106 during the removal of flushing agent by way of the pump 301 and the flushing agent line 108 for supplying the toilet unit 110 with flushing agent. An air outlet 302, arranged on the flushing agent tank 102, ensures assimilation of the pressure within the flushing agent tank 102 to the pressure within the enclosure 106 during filling of the flushing agent tank 102 with flushing agent.

Figure 5:
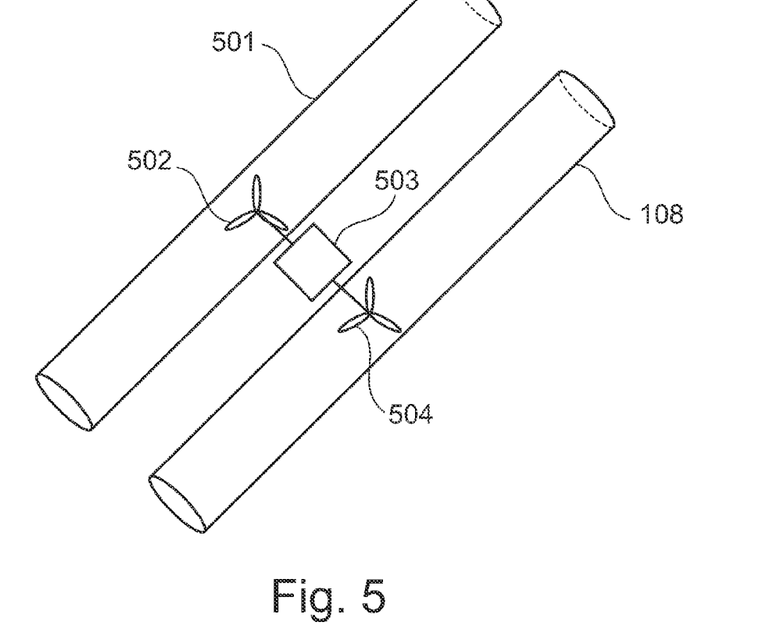
FIG. 5 shows the arrangement of a first impeller wheel in the flushing agent line and of a second impeller wheel in a second line according to an exemplary embodiment.

FIG. 5 shows a device for conveying flushing agent in the flushing agent line 108. In this arrangement, a second impeller wheel 502 is arranged in a second line 501. The second impeller wheel 502 is driven by means of differential pressure in the second line 501, and by way of a connection 503 drives the first impeller wheel 504 in the flushing agent line 108. In this arrangement, the second line 501 can be a line of the central disposal device 701, 702, and the differential pressure present in the aforesaid can be utilized to drive the second impeller wheel 502.

The second impeller wheel 502 is coupled, by way of a connection 503 for example a gear arrangement, to the first impeller wheel 504. However, the second impeller wheel 502 can also be coupled to the first impeller wheel 504 merely by way of a shaft. In this arrangement, the first impeller wheel 504 in the flushing agent line 108 is used to force the flushing agent from the flushing agent tank 102 into the toilet unit 110.

Figure 6:
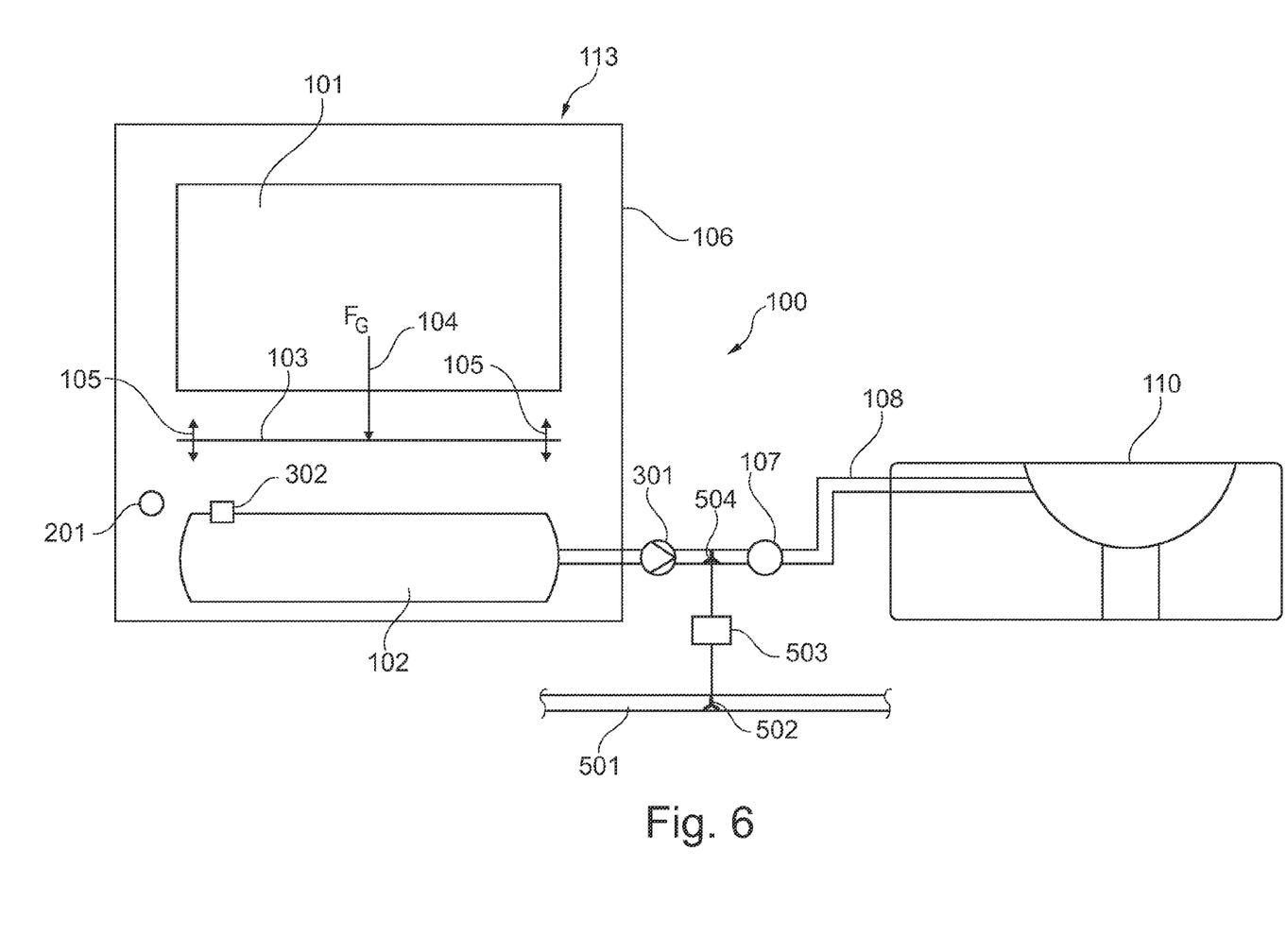
FIG. 6 shows a toilet for a vehicle according to a further exemplary embodiment.

FIG. 6 shows a toilet 100 for a toilet system 700 for a vehicle according to a further exemplary embodiment. In this arrangement, the enclosure 106 of the decentralized supply device 113 comprises a fresh-water tank 101, a flushing agent tank 102, a movable intermediate floor 103, and a pressure accumulator 201. The flushing agent tank 102 comprises an air inlet 302 and an air outlet 302. The movable intermediate floor 103 is designed, by means of a weight force 104 of the fresh-water tank 101, to exert pressure, along the directional arrows 105, together with the pressure accumulator 201, on the flushing agent tank 102, as described above.

A flushing agent line 108 connects the flushing agent tank 102 to the toilet unit 110. Within the flushing agent line (108) a pump 301, a pressure reducer 107, and a first impeller wheel 504 are arranged. In this arrangement, the first impeller wheel 504 is driven by a second impeller wheel 502, located in a second line 501, by way of a connection 503.

FIG. 6 shows an exemplary embodiment of a toilet 100 of a toilet system 700 for a vehicle. For this, an exemplary combination of the characteristics of the embodiments described further above of a toilet 100 of a toilet system 700 for a vehicle is shown.

Figure 7:
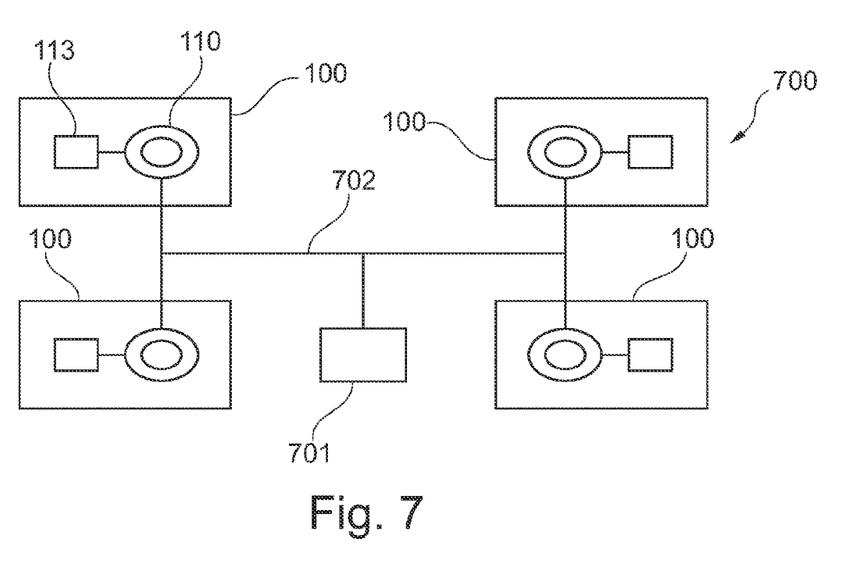
FIG. 7 shows a toilet system for a vehicle comprising a multitude of toilets according to a further exemplary embodiment.

FIG. 7 shows a toilet system 700 for a vehicle according to an exemplary embodiment. The exemplary toilet system 700 comprises four toilets 100, wherein this does not preclude the toilet system 700 from comprising more or fewer than four toilets 100. Each toilet 100 comprises a decentralized supply device 113 and a toilet unit 110 and is coupled to a central disposal device 701, 702. For the sake of clarity, not all the elements of the toilets 100 comprise reference characters. The reference characters denoting the decentralized supply device 113 and the toilet unit 110 of course correspondingly apply to all the toilets 100 of the toilet system 700.

Figure 8:
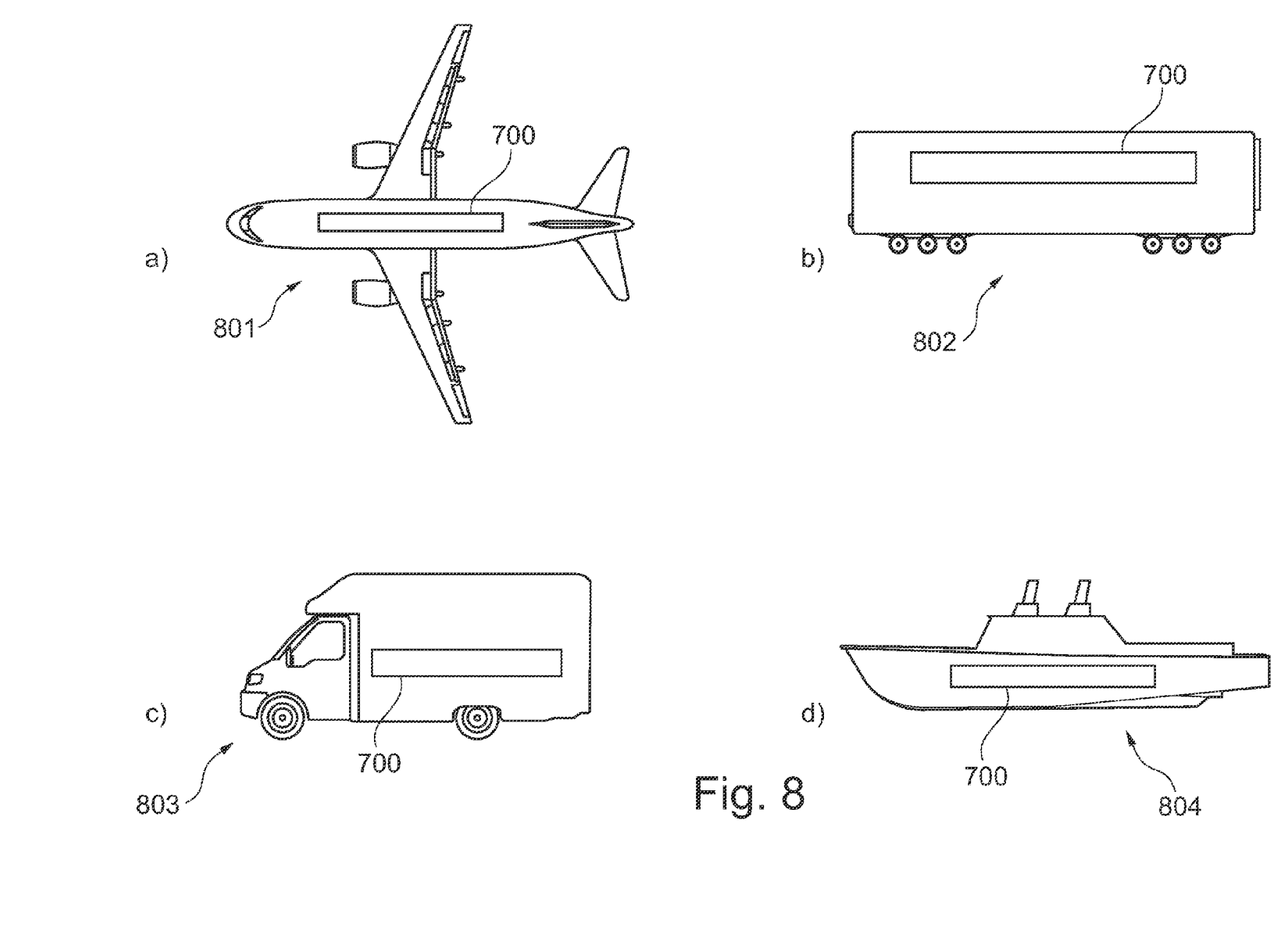
FIG. 8A shows an aircraft comprising a toilet system for a vehicle according to an exemplary embodiment.
FIG. 8B shows a railroad car comprising a toilet system for a vehicle according to an exemplary embodiment.
FIG. 8C shows a recreational vehicle comprising a toilet system for a vehicle according to an exemplary embodiment.
FIG. 8D shows a ship or boat comprising a toilet system for a vehicle according to an exemplary embodiment.

FIGS. 8A, 8B, 8C, 8D show exemplary applications of the toilet system 700 according to the embodiments in various vehicles. For example, a toilet system 700 according to the embodiments can be used in an aircraft (FIG. 8A), a rail car (FIG. 8B), a recreational vehicle (FIG. 8C), and in a ship or boat (FIG. 8D). The toilet system 700 according to the embodiments can thus be used in any vehicle in which as a result of large numbers of passengers or for reasons of convenience a multitude of toilets are provided so that they are distributed over the entire vehicle.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A toilet system for a vehicle, comprising:
   a first toilet unit configured for installation in the vehicle;
   a second toilet unit configured for installation in the vehicle;
   a first decentralized supply device comprising a first flushing agent tank configured to supply the first toilet unit with a first flushing agent, the first decentralized supply device including a housing and a first fresh-water tank configured to supply a wash basin associated with the first toilet unit with fresh water, the first fresh-water tank and the first flushing agent tank arranged in the housing;
   a second decentralized supply device comprising a second flushing agent tank configured to supply the second toilet unit with a second flushing agent; and
   a central disposal device configured to receive wastewater from the first toilet unit and from the second toilet unit;
   wherein the first flushing agent comprises gray water and the wash basin is configured to supply fresh water that has been used in the wash basin as gray water to the first flushing agent tank.

2. The toilet system of claim 1,
   wherein the second decentralized supply device comprises a second fresh-water tank.

3. The toilet system of claim 1,
   wherein the first flushing agent is forced from the first flushing agent tank into the first toilet unit with a pump.

4. The toilet system of claim 1,
   wherein the first flushing agent tank is connected to the first toilet unit by way of a first flushing agent line.

5. The toilet system of claim 1,
   wherein an air inlet and an air outlet are arranged on the first flushing agent tank.

6. The toilet system of claim 4, further comprising:
   a second line;
   a first impeller wheel in the first flushing agent line; and
   a second impeller wheel in the second line,
   wherein the second impeller wheel is driven with a differential pressure in the second line,
   wherein the first impeller wheel is driven by the second impeller wheel by way of a connection, and
   wherein the first flushing agent is forced by the first impeller wheel to move into the first toilet unit.

7. A transport, comprising:
   a first toilet unit;
   a second toilet unit;
   a first decentralized supply device comprising a first flushing agent tank configured to supply the first toilet unit with a first flushing agent, the first decentralized supply device including a housing and a fresh-water tank configured to supply a wash basin associated with the first toilet unit with fresh water, the fresh-water tank and the first flushing agent tank arranged in the housing;
   a second decentralized supply device comprising a second flushing agent tank configured to supply the second toilet unit with a second flushing agent; and
   a central disposal device configured to receive wastewater from the first toilet unit and from the second toilet unit;
   wherein the first flushing agent comprises gray water and the wash basin is configured to supply fresh water that has been used in the wash basin as gray water to the first flushing agent tank.

8. The transport of claim 7, wherein the transport is an aircraft.

9. A method for flushing a toilet system of a vehicle, the method comprising:
   supplying a first toilet unit with a first flushing agent from a first decentralized supply device, the first decentralized supply device comprising a first flushing agent tank configured to supply the first toilet unit with the first flushing agent, the first decentralized supply device including a housing and a fresh-water tank configured to supply a wash basin associated with the first toilet unit with fresh water, the fresh-water tank and the first flushing agent tank arranged in the housing; and
   supplying a second toilet unit with a second flushing agent from a second decentralized supply device, the second decentralized supply device comprising a second flushing agent tank configured to supply the second toilet unit with the second flushing agent; and
   disposing of wastewater from the first toilet unit and the second toilet unit by way of a central disposal device;
   wherein the first flushing agent comprises gray water and the wash basin is configured to supply fresh water that has been used in the wash basin as gray water to the first flushing agent tank.

\* \* \* \* \*